United States Patent [19]

Rose

[11] 4,440,714
[45] Apr. 3, 1984

[54] INERTIAL CONFINEMENT FUSION METHOD PRODUCING LINE SOURCE RADIATION FLUENCE

[75] Inventor: Ronald P. Rose, Peters Township, Washington County, Pa.

[73] Assignee: The United States of America as represented by the United States Department of Energy, Washington, D.C.

[21] Appl. No.: 229,357

[22] Filed: Jan. 29, 1981

[51] Int. Cl.³ .............................................. G21B 1/00
[52] U.S. Cl. ..................................... 376/104; 376/102
[58] Field of Search .................................. 376/100–106, 376/151, 152; 350/295, 255, 252, 448

[56] References Cited

U.S. PATENT DOCUMENTS

| | | | |
|---|---|---|---|
| 3,094,474 | 6/1963 | Gale | 376/106 |
| 3,094,581 | 6/1963 | Back | 350/255 |
| 3,107,210 | 10/1963 | Mallinckrodt | 376/151 |
| 3,404,403 | 10/1968 | Vallese et al. | 350/255 |
| 3,609,369 | 9/1971 | Croitoru | 376/151 |
| 4,090,781 | 5/1978 | Godof et al. | 350/255 |
| 4,099,852 | 7/1978 | Kobierecki et al. | 350/255 |
| 4,118,274 | 10/1978 | Bakken . | |
| 4,138,317 | 2/1979 | Porter et al. . | |
| 4,140,576 | 2/1979 | Fink et al. . | |
| 4,140,577 | 2/1979 | Fink et al. . | |
| 4,142,088 | 2/1979 | Hirsch | 376/104 |
| 4,143,946 | 3/1979 | Leo et al. | 350/295 |
| 4,158,598 | 6/1979 | Baird . | |
| 4,175,830 | 11/1979 | Marie | 376/104 |
| 4,205,278 | 5/1980 | George et al. | 376/104 |
| 4,303,731 | 12/1981 | Torobin | 376/152 |

FOREIGN PATENT DOCUMENTS

| | | | |
|---|---|---|---|
| 2702665 | 7/1978 | Fed. Rep. of Germany | 376/103 |
| 2738095 | 3/1979 | Fed. Rep. of Germany | 376/104 |
| 51-24496 | 2/1976 | Japan | 376/152 |
| 52-17789 | 2/1977 | Japan | 376/101 |

OTHER PUBLICATIONS

Atomkernenergie-Kerntechnik Bd 36 (1980), Lfg. 3, pp. 225–226, Winterberg.
ENG/CTR/TM-31, 1974, Burke, pp. 1–12, FIGS. 1–4.
Nuclear Instruments & Methods, vol. 89, No. 1, 1970, pp. 167–172, Jungerman et al.
Applied Optics, Frank et al., vol. 16, No. 5, pp. 1243–1252.
J. of the British Interplanetary Society, vol. 30, 1977, pp. 333–340, Winterberg.
Nature, vol. 258, No. 5535, 12/75, (Reprint, Identified as pp. 1, 2), "Ignition by Shock Wave Focusing and Staging of Thermonuclear Micro Explosions", Winterberg.
J. Phys. D. Appl. Phys., vol. 9, 1976, pp. L105–L108, Winterberg.

Primary Examiner—Harvey E. Behrend
Attorney, Agent, or Firm—K. R. Bowers, Jr.; Z. L. Dermer

[57] ABSTRACT

An inertial confinement fusion method in which target pellets are imploded in sequence by laser light beams or other energy beams at an implosion site which is variable between pellet implosions along a line. The effect of the variability in position of the implosion site along a line is to distribute the radiation fluence in surrounding reactor components as a line source of radiation would do, thereby permitting the utilization of cylindrical geometry in the design of the reactor and internal components.

2 Claims, 5 Drawing Figures

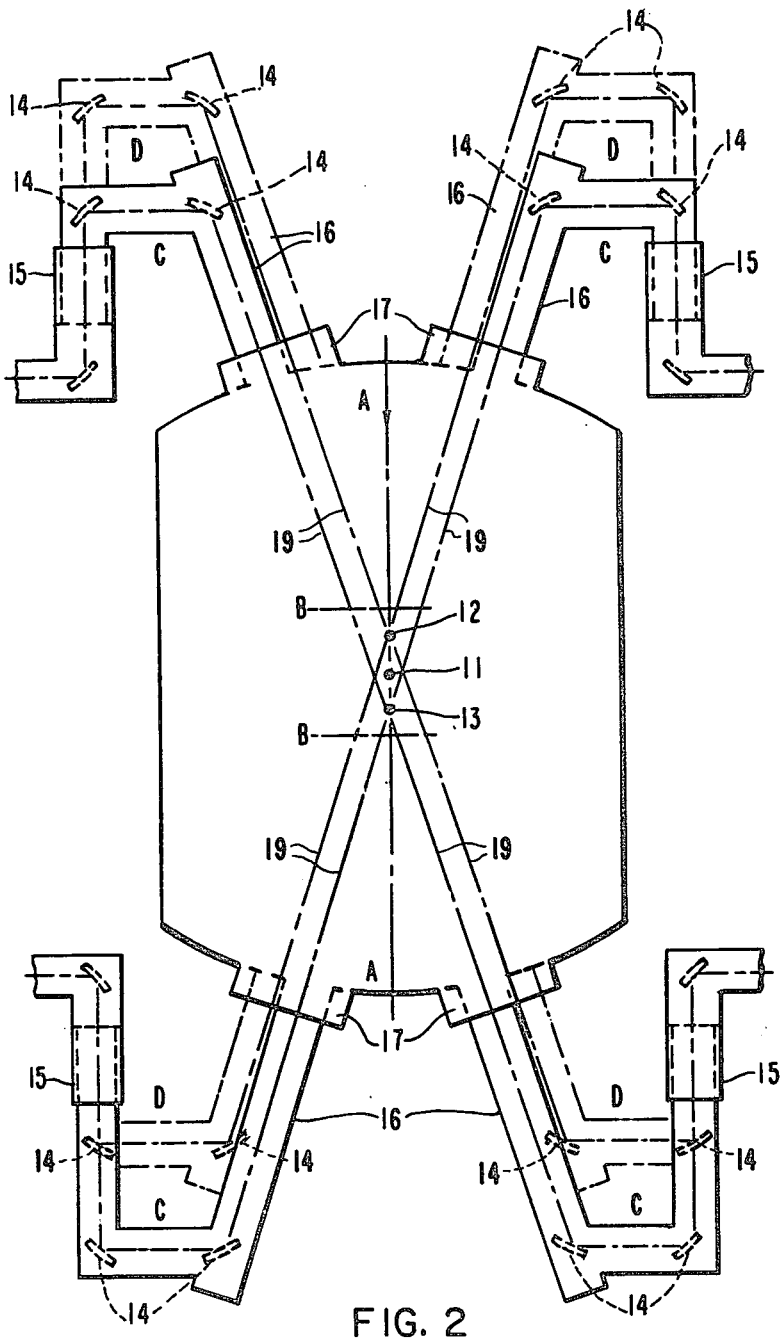
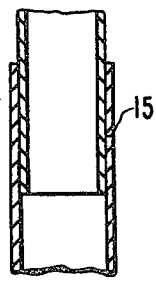
FIG. 2
FIG. 3

INERTIAL CONFINEMENT FUSION METHOD PRODUCING LINE SOURCE RADIATION FLUENCE

GOVERNMENT CONTRACT

This invention was conceived during performance of a contract with the U.S. Government, designated DE-AC08-78DP40073.

BACKGROUND OF THE INVENTION

This invention relates generally to a system for the fusion of a plasma by energy beam illumination of a target pellet of plasma-forming material. More specifically, the invention relates to laser fusion reactors. Thermonuclear fusion reactors are a potential and prominent proposed solution to the long-term energy problem. One area of interest in fusion reactor research is the investigation of the potential for laser fusion. In this technique, fusion would be induced in a spherical pellet of deuterium and/or tritium containing material by illuminating it with an intense, coherent and, preferably, spherically symmetric pulse of light from a laser. The general theoretical process of inducing fusion by means of a laser is well-known and described in the prior art. Briefly stated, the energy of a sufficiently intense pulse of laser light focused onto the surface of the target pellet is absorbed by the surface of the pellet, causing the surface to vaporize and expand away from the center of the pellet at high velocity. The reaction force from this expansion compresses the remainder of the pellet to high density, and the combined effect of the illumination and compression heats the resultant plasma to a high temperature. If the combination of time of duration, temperature and density of the compressed plasma is sufficiently large, a so induced fusion reaction of the deuterium and/or tritium will generate more energy than was required to compress and heat the pellet, thereby accomplishing a net generation of energy.

Since the confinement of the plasma for a short time during the fusion burn is due to the inertia of the compressed pellet material, the above-described process is called Inertial Confinement Fusion (ICF).

The fusion reaction releases copious amounts of X-ray, ion, and neutron radiation. The radiation can be used to produce useful power by the heating of a coolant fluid and can also induce useful nuclear transformations in blanket and fuel assemblies located in the reactor. The neutrons can generate additional energy by inducing fission reactions in nearby fuel assemblies.

An ICF reactor need not be designed to be capable of net energy generation in order to be a useful device due to the above-mentioned nuclear transformations, especially transformations of nuclear species from fertile to fissile species.

A power reactor will utilize fuel pellets in rapid succession, with in excess of 10 pellets per second being a not unlikely rate of use. Despite this high use rate, the radiation flux is not continuous, but rather arrives at the surface of the reactor container (called the "first wall") and the fuel and blanket assembly surfaces in intense, brief bursts after each pellet implosion. The radiation flux can be destructive of the impacted surfaces.

The implosion of the pellet by laser light has been thought to require that the pellet be illuminated uniformly over its surface such that the pellet compression is also uniform. In old art, the pellet is simultaneously illuminated by several laser beams from beam sources mounted at intervals around a spherical reactor vessel, the pellet being located at the center. The beam sources are usually optical systems comprising mirrors and prisms which split a laser beam from a single laser into a plurality of beams which are then directed to the pellet from different directions. The pellet becomes a point source of plasma which emits radiation uniformly in all directions.

All known approaches to ICF devices have specified a single pellet implosion site. This has been required in part by the use of multiple beams of laser light from various directions to achieve uniform pellet surface illumination. Simultaneous beam arrival at a single site is most conveniently arranged when the pellet is located equidistant from all beam sources: that is, at the center of a spherical vessel.

Recent developments in the art indicate that less uniform illumination, even two-sided illumination, will suffice.

The fusion burn of a pellet at an implosion site at the center of the reactor vessel exposes the first wall, fuel assemblies and blanket assemblies to a point source flux of various types of radiation. This flux uniformly irradiates the first wall, fuel and blanket assemblies only if these members are shaped to present a spherical surface, centered at the implosion site, to the radiation flux. A uniform exposure of the first wall is desirable to most widely distribute the heat deposited therein, thereby reducing peak wall temperatures and reducing consequent wall erosion and other damage mechanisms. The uniform exposure of the blanket assemblies is desirable for these reasons as well, and also optimizes the production of nuclear isotopes. A uniform neutron flux in the fuel assemblies reduces peak temperatures and heat fluxes there, enhancing the usable life of the assemblies.

Despite the advantages of uniform radiation exposure, it is inconvenient to design the first wall, and fuel and blanket assemblies to be spherical or quasispherical. Engineering considerations suggest that cylindrical geometry for these members is preferred.

Consequently, it is an object of this invention to provide an ICF system which achieves an approximately uniform cumulative radiation exposure of the first wall, and fuel and blanket assembly members while avoiding the need to shape these as spheres.

SUMMARY OF THE INVENTION

The invention is an ICF device and process in which the site of the pellet implosion is varied along a straight line which is along the pellet injection path and which may be an axis of the reactor vessel. The variation of the site along a line does not create a true line source since each individual implosion remains a point source of radiation. However, the cumulative radiation flux exposure, in the fuel and blanket assemblies and in the first wall approximates that which would result from a radiation line source. Depending on the selection of the implosion site over time, the cumulative radiation damage in a cylindrical first wall and fuel and blanket assemblies and the nuclear transformations in cylindrical blanket and fuel assemblies may be distributed with a uniformity which is improved over that distribution which obtains from a single implosion site in combination with cylindrical members. The implosion site variation matches the radiation source geometry to the cylindrical geometry considered desirable in physical reactor components.

BRIEF DESCRIPTION OF THE DRAWINGS

The character of the invention will be best understood by reference to the detailed description taken with the drawings, in which:

FIG. 2 is a schematic diagram which illustrates a first implementation of the invention;

FIG. 3 is an enlargement of a portion of FIG. 2;

DETAILED DESCRIPTION OF THE INVENTION

Figure 1:
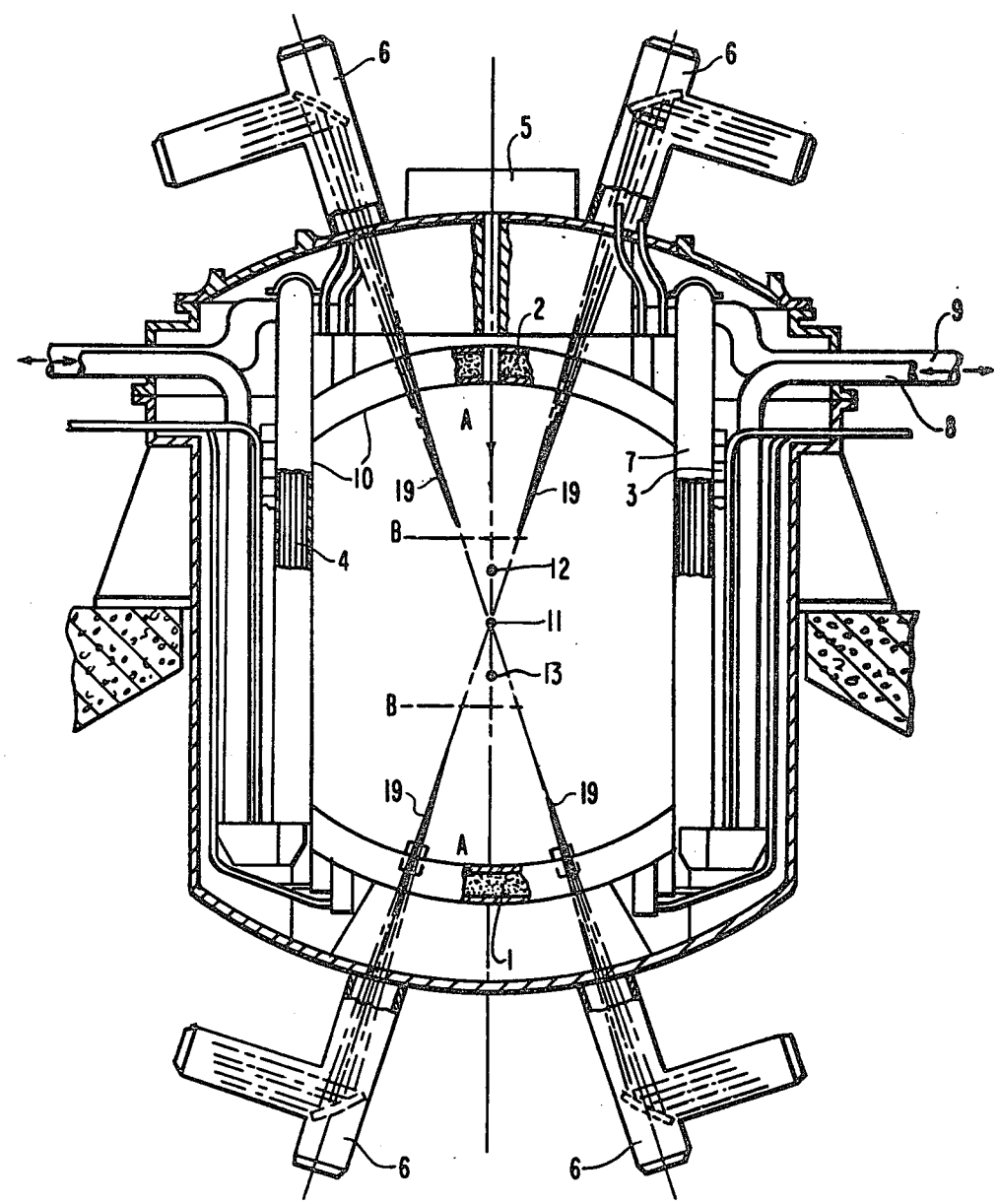
FIG. 1 is a schematic diagram of a laser fusion reactor.

Refer to FIG. 1 which schematically discloses the basic concept of a variable pellet implosion site in a fusion reactor.

FIG. 1 has the following features which are considered old art in ICF devices:

a bottom blanket 1 and top blanket 2 wherein nuclear species are located for the breeding of useful isotopes (tritium and plutonium 239 being usual products);

a plurality of radial blanket assemblies 3 wherein useful isotopes may also be generated;

a group of fuel assemblies 4 wherein energy may be produced by nuclear fission as induced by neutrons released by the fusion process in the pellet;

a pellet injection system 5;

a plurality of beam sources 6, the preferred beam being laser light;

means for heat removal shown here as a liquid sodium heat exchanger 7 having inlet 8 and outlet 9;

a first wall 10, intended to encompass all interior surfaces of the reactor exposed to radiation directly from the pellet fusion burn.

The pellet is injected into the reactor by the injection system 5 and by gravity and momentum travels along path A-A in FIG. 1. According to the prior art, the pellet is illuminated by the beams 19 upon reaching the central implosion site 11 which initiates a fusion reaction in the pellet. Radiation (not shown) from the pellet then emanates from site 11 outward striking first wall 10 and all blanket assemblies 1, 2, 3, and fuel assemblies 4.

The new feature of this invention is the variation in axial position of the pellet implosion site 11. FIG. 1 shows a range B-B along path A-A which range is a locus of equally spaced points chosen to be implosion sites. The site variation causes the radiation deposited in reactor components to seem to have a line source. The time integrated radiation flux, defined as the fluence, is a line source fluence.

Range B-B is limited in length such that no site is prohibitively close to the first wall 10.

FIG. 1 shows representative implosion sites 12 and 13.

The choice of an implosion site is accomplished by control of the timing of the firing of the laser such that the pellet is located at the desired site, and by control of the path of the laser light.

The variation in implosion site along A-A may be accomplished in discrete steps taken between even subsequent pellet shots but may preferentially be achieved by changes made over a period of days or weeks. The description of the implosion site distribution in time and in space along B-B in order to achieve a line source fluence in the radial blanket assemblies 3, fuel assemblies 4, and first wall 10 may be preplanned or developed during reactor operation in response to radiation measurements.

Applications may arise in which a non-uniform line source fluence is desired, which can be obtained by an appropriate frequency of implosions along range B-B.

The axial variation of the implosion site along B-B matches the fluence to the use of cylindrical geometry in the first wall 10, fuel assemblies 4, and radial blanket assemblies 3.

To provide a means of varying the point of implosion for ICF pellets, the optics of the laser system must permit focusing over a locus of points (B-B). Furthermore, the means of achieving this change in focal point should substnatially preserve the characteristics of symmetric illumination to avoid giving the pellet an asymmetric impulse during implosion. A first approach to achieving these conditions is simply to raise or lower the beam sources 6 of the laser beam system as illustrated in FIG. 2. FIG. 2 is a schematic diagram of an ICF reactor in which the beam sources 6 in FIG. 1 have been shown as having a system of optical mirrors 14. As shown in FIG. 2, the final two mirrors 14 in each of the beam sources 6 would be raised and lowered by an amount sufficient to change the locus of implosion sites over the desired distance. The coupling between the beam sources 6 and the remainder of the laser beam system would be accomplished by a sliding joint 15 in a periscope-like arrangement as shown in the detail of FIG. 3 for one of the beam sources 6. This approach would require a flexible penetration 17 for each of the beam sources 6 into the upper and lower access points of the reactor such that some degree of horizontal translation of the beam sources 6 is accommodated as they are raised and lowered. Position C in FIG. 2 is intended to correspond to a laser beam focus at implosion site 13 while position D corresponds to a laser beam focus at implosion site 12.

Figure 5:
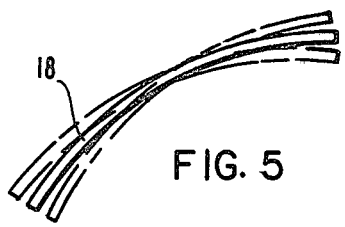
FIG. 5 is an enlargement of a portion of FIG. 4.
Figure 4:
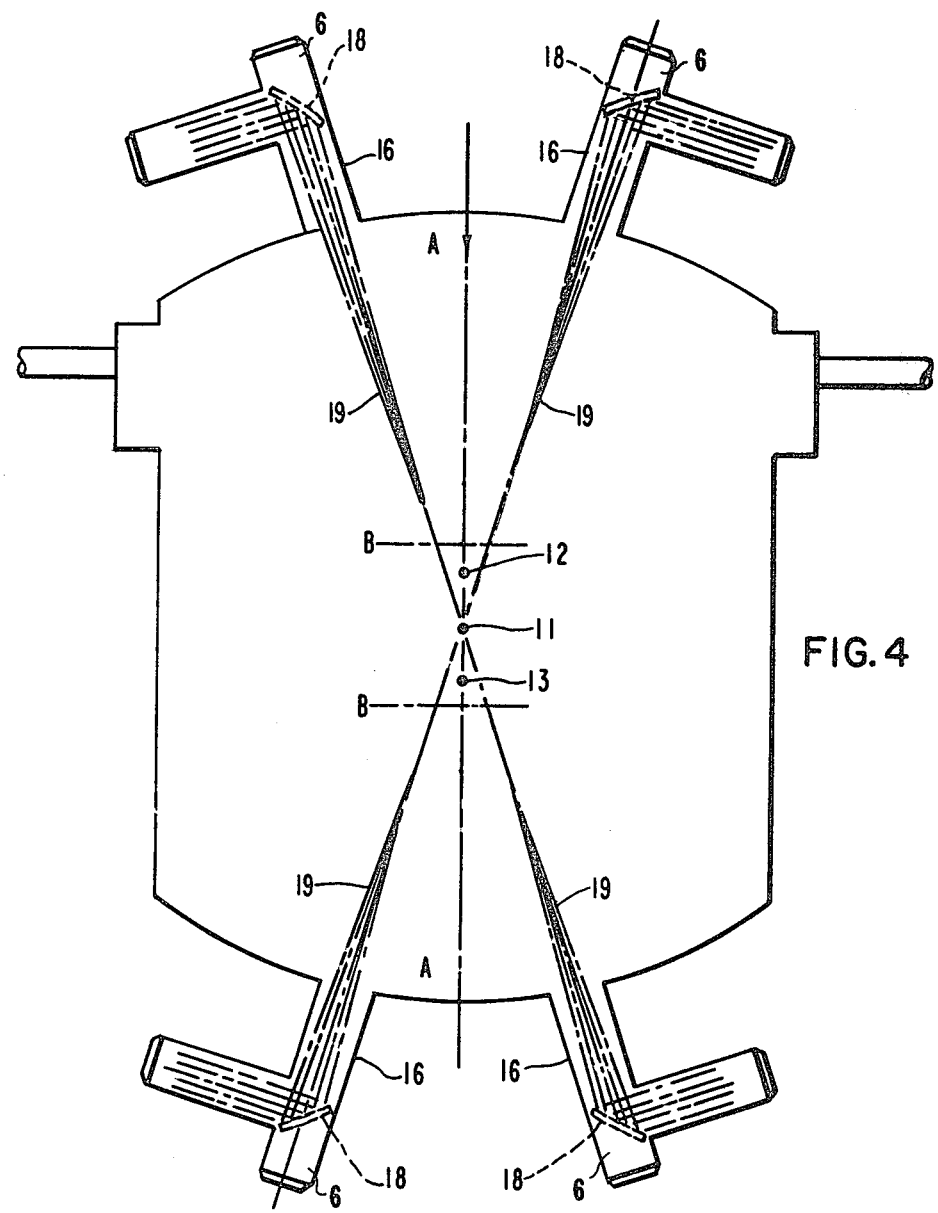
FIG. 4 is a schematic diagram of a second implementation concept.

A second arrangement to provide a linear adjustment or a variable locus of implosion sites is illustrated in FIG. 4. FIG. 4 is a schematic of an ICF reactor in which the beam sources 6 are not mobile as are the beam sources 6 in FIG. 2. This concept utilizes the techniques of adaptive optics (see Active Optical Devices and Applications-Volume 228, from the SPIE Proceedings, 1979) to change the curvature as well as the orientation of flexible mirrors 18 in each of the beam sources 6. This change is illustrated for one such flexible mirror 18 in FIG. 5 which shows the flexible mirror 18 in three different configurations with changes in both curvature and angle of inclination. The net effect is variation along range B-B of the focal point of the mirror 18 on line A-A. If done appropriately for all beam sources 6, the focal point of all beams 19 (of which 4 are shown in FIG. 4) will occur at the desired location for pellet implosion along A-A and within B-B.

Variations in the focal length of the flexible mirrors 18 on the order of ±5% should be sufficient to effect the changes in implosion location of interest to this concept.

There is a possibility that the effects of unequal focal lengths in the upper and lower laser beam sources 6 may give an asymmetric illumination and intensity and therefore an upward or downward impulse on the pellet during implosion. If this proves to be a problem, compensation for this asymmetry can be provided by introducing optical aberrations in the adaptive behavior of the optics to ensure symmetric illumination intensity. These aberrations would have the effect of slightly defocusing either the upper or lower beam sources 6 to appropriately adjust the symmetry of the illumination intensity.

While in the above, two alternative methods to provide a locus of implosion sites is given, it is obvious that other means including optical, mechanical, and other techniques may be provided to accomplish the controlled aim of laser beams.

The invention is not limited to laser fusion but can also be used in systems in which alternative fusion-initiating energy beams, such as electron beams, are employed.

The reactors illustrated in FIGS. 1, 2, and 4 will of course have many components which are not included therein since there are not considered part of this invention. It is assumed, for example, that conventional systems will be used to time the firing of the beam sources 6 such that the pellet, in flight, is illuminated by the beam or beams at the proper implosion site.

While in the foregoing a general invention has been described, it should be understood that various changes may be made without departing from the true spirit and scope of the invention. For example, the selection of the implosion site might be an automated decision based on a radiation fluence as continuously calculated by a computer using detected radiation flux levels. Therefore, the specification and drawings should be interpreted as illustrative rather than limiting.

I claim:
1. A method for extracting useful radiation in a controlled manner from target pellets imploded by an energy beam in an inertial confinement fusion reactor such that components of said reactor are subjected to an approximately linear source radiation fluence, which comprises
   (A) injecting a first target pellet into the reactor causing said pellet to follow a trajectory which is a linear path;
   (B) directing an energy beam at a first site along said linear path timed to intersect and strike said pellet thereby inducing fusion through inertial confinement;
   (C) injecting a second target pellet into the reactor along said linear path;
   (D) directing said energy beam at a second site along said linear path, said second site being displaced from said first site by a first distance in one dimension along said linear path, said energy beam timed to intersect and introduce inertial confinement fusion in said second pellet at said second site;
   (E) repeating the above steps C and D with third, fourth and subsequent pellets and third, fourth and subsequent sites, and second, third, and subsequent distances such that all fusion events occur along a line being said linear path and reactor components are exposed to an approximately linear source radiation fluence.
2. The method of claim 1 wherein the beam is laser light.

* * * * *